United States Patent
DeMersseman et al.

(10) Patent No.: US 10,684,370 B2
(45) Date of Patent: Jun. 16, 2020

(54) MULTIFUNCTION VEHICLE DETECTION SYSTEM

(71) Applicant: Veoneer US, Inc., Southfield, MI (US)

(72) Inventors: Bernard DeMersseman, Southfield, MI (US); Emil Hällstig, Southfield, MI (US); Jonas Sjöberg, Southfield, MI (US); Peter Hansson, Southfield, MI (US)

(73) Assignee: Veoneer US, Inc., Southfield, MA (US)

( * ) Notice: Subject to any disclaimer, the term of this patent is extended or adjusted under 35 U.S.C. 154(b) by 0 days.

(21) Appl. No.: 15/898,392

(22) Filed: Feb. 16, 2018

(65) Prior Publication Data

US 2019/0101644 A1  Apr. 4, 2019

Related U.S. Application Data

(60) Provisional application No. 62/565,373, filed on Sep. 29, 2017, provisional application No. 62/594,284, (Continued)

(51) Int. Cl.

| G01C 3/08 | (2006.01) |
|---|---|
| G01S 17/02 | (2020.01) |
| G01S 17/93 | (2020.01) |
| G01S 7/481 | (2006.01) |
| G01S 17/42 | (2006.01) |

(Continued)

(52) U.S. Cl.
CPC .......... *G01S 17/023* (2013.01); *G01S 7/4813* (2013.01); *G01S 17/10* (2013.01); *G01S 17/42* (2013.01); *G01S 17/936* (2013.01); *H04N 5/2252* (2013.01); *H04N 5/2253* (2013.01);

(Continued)

(58) Field of Classification Search
CPC .... G01S 17/023; G01S 7/4813; G01S 17/936; G01S 17/42; G01S 17/10; G01S 7/4817; H04N 5/2252; H04N 5/2254; H04N 5/2253; G05D 1/0248
See application file for complete search history.

(56) References Cited

U.S. PATENT DOCUMENTS

| 3,712,985 A | 1/1973 | Swarner et al. |
|---|---|---|
| 4,184,154 A | 1/1980 | Albanese et al. |

(Continued)

FOREIGN PATENT DOCUMENTS

| AT | 509180 B1 | 1/2016 |
|---|---|---|
| DE | 19757840 C1 | 9/1999 |

(Continued)

OTHER PUBLICATIONS

Invitation to Pay Additional Fees dated Mar. 8, 2019 in PCT/US2018/052849.

(Continued)

*Primary Examiner* — Howard D Brown, Jr.
(74) *Attorney, Agent, or Firm* — Burns & Levinson LLP; Steven M. Mills

(57) ABSTRACT

A detection system for a vehicle in an environment includes a lens within an aperture. A line camera is configured to receive light passing through the lens from the environment to generate image data. A LiDAR system is configured to transmit light through the lens to the environment and receive light passing through the lens from the environment to generate range data.

21 Claims, 8 Drawing Sheets

Related U.S. Application Data filed on Dec. 4, 2017, provisional application No. 62/623,589, filed on Jan. 30, 2018.

(51) Int. Cl.
  *G01S 17/10* (2020.01)
  *H04N 5/225* (2006.01)
  *G05D 1/02* (2020.01)

(52) U.S. Cl.
  CPC .......... *H04N 5/2254* (2013.01); *G01S 7/4817* (2013.01); *G05D 1/0248* (2013.01)

(56) References Cited

U.S. PATENT DOCUMENTS

| | | | |
|---|---|---|---|
| 4,439,766 A | 3/1984 | Kobayashi et al. | |
| 4,957,362 A | 9/1990 | Peterson | |
| 5,210,586 A | 5/1993 | Grage et al. | |
| 5,274,379 A | 12/1993 | Carbonneau | |
| 5,428,215 A | 6/1995 | Dubois et al. | |
| 5,604,695 A | 2/1997 | Cantin et al. | |
| 5,793,491 A | 8/1998 | Wangler et al. | |
| 5,889,490 A | 3/1999 | Wachter et al. | |
| 5,966,226 A | 10/1999 | Gerber | |
| 6,559,932 B1 | 5/2003 | Halmos | |
| 7,227,116 B2 | 6/2007 | Gleckler | |
| 7,272,271 B2 | 9/2007 | Kaplan et al. | |
| 7,440,084 B2 | 10/2008 | Kane | |
| 7,483,600 B2 | 1/2009 | Achiam et al. | |
| 8,508,723 B2 | 8/2013 | Chang et al. | |
| 8,629,975 B1 | 1/2014 | Dierking et al. | |
| 8,742,325 B1 | 6/2014 | Droz et al. | |
| 8,836,922 B1* | 9/2014 | Pennecot | G01S 17/89 356/4.01 |
| 9,063,549 B1 | 6/2015 | Pennecot et al. | |
| 9,086,273 B1 | 7/2015 | Gruver et al. | |
| 9,090,213 B2 | 7/2015 | Lawlor et al. | |
| 9,097,646 B1 | 8/2015 | Campbell et al. | |
| 9,267,787 B2 | 2/2016 | Shpunt et al. | |
| 9,285,477 B1 | 3/2016 | Smith et al. | |
| 9,575,162 B2 | 2/2017 | Owechko | |
| 9,618,742 B1 | 4/2017 | Droz et al. | |
| 9,869,754 B1 | 1/2018 | Campbell et al. | |
| 10,473,767 B2 | 11/2019 | Xiang et al. | |
| 2001/0052872 A1 | 12/2001 | Hahlweg | |
| 2003/0043363 A1 | 3/2003 | Jamieson | |
| 2004/0031906 A1 | 2/2004 | Glecker | |
| 2004/0135992 A1 | 7/2004 | Munro | |
| 2006/0221250 A1 | 10/2006 | Rossbach et al. | |
| 2006/0232052 A1* | 10/2006 | Breed | B60R 21/013 280/735 |
| 2007/0181810 A1 | 8/2007 | Tan et al. | |
| 2008/0088499 A1 | 4/2008 | Bonthron et al. | |
| 2008/0219584 A1 | 9/2008 | Mullen | |
| 2008/0246944 A1 | 10/2008 | Redman et al. | |
| 2009/0002680 A1 | 1/2009 | Ruff et al. | |
| 2009/0010644 A1 | 1/2009 | Varshneya et al. | |
| 2009/0190007 A1 | 7/2009 | Oggier | |
| 2010/0157280 A1* | 6/2010 | Kusevic | G01S 7/4972 356/4.01 |
| 2010/0182874 A1 | 7/2010 | Frank et al. | |
| 2012/0236379 A1 | 9/2012 | da Silva et al. | |
| 2012/0310516 A1* | 12/2012 | Zeng | G01C 21/32 701/300 |
| 2013/0093584 A1 | 4/2013 | Schumacher | |
| 2013/0120760 A1 | 5/2013 | Raguin et al. | |
| 2013/0206967 A1 | 8/2013 | Shpunt et al. | |
| 2013/0207970 A1 | 8/2013 | Shpunt et al. | |
| 2014/0036252 A1 | 2/2014 | Amzajerdian et al. | |
| 2014/0049609 A1* | 2/2014 | Wilson | G01S 17/89 348/46 |
| 2014/0152975 A1 | 6/2014 | Ko | |
| 2014/0168631 A1* | 6/2014 | Haslim | G01S 17/06 356/4.01 |
| 2015/0009485 A1 | 1/2015 | Mheen | |
| 2015/0260843 A1 | 9/2015 | Lewis | |
| 2015/0301162 A1 | 10/2015 | Kim | |
| 2015/0371074 A1 | 12/2015 | Lin | |
| 2015/0378011 A1 | 12/2015 | Owechko | |
| 2016/0047895 A1 | 2/2016 | Dussan | |
| 2016/0178749 A1 | 6/2016 | Lin et al. | |
| 2016/0245902 A1 | 8/2016 | Watnik et al. | |
| 2016/0291160 A1 | 10/2016 | Zweigle et al. | |
| 2016/0357187 A1* | 12/2016 | Ansari | G01S 15/931 |
| 2016/0363669 A1 | 12/2016 | Liu | |
| 2016/0380488 A1 | 12/2016 | Widmer | |
| 2017/0090013 A1 | 3/2017 | Paradie et al. | |
| 2017/0269215 A1 | 9/2017 | Hall et al. | |
| 2017/0307736 A1* | 10/2017 | Donovan | G01S 7/484 |
| 2018/0241477 A1 | 8/2018 | Turbide et al. | |
| 2018/0341009 A1 | 11/2018 | Niclass et al. | |
| 2018/0364334 A1 | 12/2018 | Xiang et al. | |
| 2019/0146060 A1 | 5/2019 | Qiu et al. | |
| 2019/0235064 A1 | 8/2019 | Droz et al. | |

FOREIGN PATENT DOCUMENTS

| | | |
|---|---|---|
| DE | 102004033944 A1 | 2/2006 |
| DE | 102006031114 A1 | 1/2008 |
| DE | 102015217908 A1 | 3/2017 |
| EP | 0112188 A2 | 6/1984 |
| EP | 0578129 A2 | 1/1994 |
| EP | 2696166 A2 | 2/2014 |
| EP | 2824418 A1 | 1/2015 |
| EP | 3147685 A1 | 3/2017 |
| EP | 3203259 A1 | 8/2017 |
| WO | 1994019705 A1 | 9/1994 |
| WO | 2008/008970 A2 | 1/2008 |
| WO | 2015/014556 A2 | 2/2015 |
| WO | 2016/097409 A2 | 6/2016 |
| WO | 2019050643 A1 | 3/2019 |

OTHER PUBLICATIONS

Kasturi et al., UAV-Borne LiDAR with MEMS Mirror Based Scanning Capability; SPIE Defense and Commercial Sensing Conference 2016; Apr. 20, 2016; Baltimore, MD; 10 pages.
Internet URL: https://www.continental-automotive.com/en-gl/Passenger-Cars/Chassis-Safety/Advanced-Driver-Assistance-Systems/Cameras [retrieved on Dec. 20, 2018].
Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].
Roncat, Andreas, The Geometry of Airborne Laser Scanning in a Kinematical Framework, Oct. 19, 2016 [retrieved on Dec. 19, 2018] Retrieved from the Internet URL: https://www.researchgate.net/profile/Andreas_Roncat/publication/310843362_The_Geometry_of_Airborne_Laser_Scanning_in_a_Kinematical_Framework/links/5839add708ae3a74b49ea03b/The-Geometry-of-Airbome-Laser-Scanning-in-a-Kinematical-Framework.pdf.
Internet URL: http://www.advancedscientificconcepts.com/products/overview.html [retrieved on Dec. 20, 2018].
Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driiving-15758.
A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_laser_sensors_in_self-driving_cars.jsp.
Hewlett-Packard Application Note 77-4, Swept-Frequency Group Delay Measurements, Hewlett-Packard Co., Sep. 1968, 7 pages.
Kravitz et al., High-Resolution Low-Sidelobe Laser Ranging Based on Incoherent Pulse Compression, IEEE Photonics Technology Letters, vol. 24, No. 23, Dec. 1, 2012, pp. 2119-2121.
Journet et al., A Low-Cost Laser Range Finder Based on an FMCW-like Method, IEEE Transactions on Instrumentation and Measurement, Aug. 2000, vol. 49, No. 4, pp. 840-843.

(56) References Cited

OTHER PUBLICATIONS

Campbell et al., Advanced Sine Wave Modulation of Continuous Wave Laser System for Atmospheric CO2 Differential Absorption Measurements; NASA Langley Research Center; 32 pages [retrieved on Dec. 20, 2018].
Levanon et al., Non-coherent Pulse Compression—Aperiodic and Periodic Waveforms; The Institution of Engineering and Technology, 2015; 9 pages.
Peer et al., Compression Waveforms for Non-Coherent Radar, Tel Aviv University; 6 pages [retreived on Dec. 20, 2018].
Li, Larry, Time-of-Flight Camera—An Introduction, Technical White Paper, SLOA190B, Texas Instruments; Jan. 2014; 10 pages.
Pierrottet et al., Linear FMCW Laser Radar for Precision Range and Vector Velocity Measurements, Coherent Applications, Inc.; NASA Langley Research Center; 9 pages [retrieved on Dec. 20, 2018].
Kahn, Joseph M., Modulation and Detection Techniques for Optical Communication Systems, Stanford University, Department of Electrical Engineering, 2006; 3 pages.
Niclass et al., Development of Automotive LIDAR, Electronics and Communications in Japan, vol. 98, No. 5, 2015; 6 pages.
International Search Report and Written Opinion in corresponding PCT Application No. PCT/US2017/033271, International Filing Date May 18, 2017; dated Sep. 1, 2017.
Su et al, 2-D FFT and Time-Frequency Analysis Techniques for Multi-Target Recognition of FMCW Radar Signal, Proceedings of the Asia-Pacific Microwave Conference 2011, pp. 1390-1393.
Wojtkiewicz et al, Two-Dimensional Signal Processing in FMCW Radars, Instytut Podstaw Elektroniki Politechnika Warszawska, Warszawa; 6 pages [retreived on Dec. 20, 2018].
Winkler, Volker, Range Doppler Detection for Automotive FMCW Radars, Proceedings of the 4th European Radar Conference, Oct. 2007, Munich Germany; 4 pages.
Li et al., Investigation of Beam Steering Performances in Rotation Risley-Prism Scanner, Optics Express, Jun. 13, 2016, vol. 24, No. 12; 11 pages.
Thorlabs Application Note, Risley Prism Scanner; 33 pages [retrieved on Dec. 20, 2018].
Simpson et al., Intensity-Modulated, Stepped Frequency CW Lidar for Distributed Aerosol and Hard Target Measurements, Applied Optics, Nov. 20, 2005, vol. 44, No. 33, pp. 7210-7217.
International Search Report and Written Opinion in corresponding International Application No. PCT/US2017/033263, dated Aug. 29, 2017; 13 pages.
International Search Report and Written Opinion in corresponding International Application No. PCT/US2017/033265, dated Sep. 1, 2017; 15 pages.
International Search Report and Written Opinion in corresponding International Application No. PCT/US2018/054992, dated Dec. 11, 2018; 12 pages.
International Search Report and Written Opinion in corresponding International Application No. PCT/US2018/049038, dated Dec. 12, 2018; 13 pages.
International Search Report and Written Opinion in corresponding International Application No. PCT/US2018/048869, dated Nov. 8, 2018; 14 pages.
International Search Report and Written Opinion in corresponding International Application No. PCT/US2018/051281, dated Nov. 22, 2018; 14 pages.
International Search Report and Written Opinion in corresponding International Application Na PCT/US2018/057727, dated Jan. 28, 2019; 12 pages.
International Search Report and Written Opinion in corresponding International Application No. PCT/US2018/052837, dated Jan. 24, 2019; 13 pages.
Skolnik, M.I., Introduction to Radar Systems, 3rd Edition, pp. 45-48, McGraw-Hill, New York, NY 2001; 6 pages.
Range-Doppler image processing in linear FMCW Radar and FPGA Based Real-Time Implementation, Journal of Communication and Computer, vol. 6, No. 4, Apr. 2009.

\* cited by examiner

MULTIFUNCTION VEHICLE DETECTION SYSTEM

CROSS REFERENCE TO RELATED APPLICATIONS

This application claims priority to and the benefit of U.S. Provisional Patent Application No. 62/565,373, filed on Sep. 29, 2017 and titled "LIDAR PYRAMID SCANNER CONFIGURATION WITH DIFFERENT SLOPES ON THE PYRAMID AND ILLUMINATED FROM AN ANGLE BELOW", the contents of which are incorporated herein by reference as though fully set forth herein. This application also claims priority to and the benefit of U.S. Provisional Patent Application No. 62/594,284, filed on Dec. 4, 2017 and titled "LIDAR POLYGON SCANNER CONFIGURATION HAVING DIFFERENTLY SLOPED POLYGON SIDES ILLUMINATED FROM MULTIPLE SIDES", the contents of which are incorporated herein by reference as though fully set forth herein. This application also claims priority to and the benefit of U.S. Provisional Patent Application No. 62/623,589, filed on Jan. 30, 2018 and titled "SCANNING LIDAR SYSTEM AND METHOD WITH SPATIAL FILTERING FOR REDUCTION OF AMBIENT LIGHT", the contents of which are incorporated herein by reference as though fully set forth herein.

FIELD OF THE INVENTION

The subject disclosure relates to object detection and more particularly to detection systems for vehicles.

BACKGROUND OF THE INVENTION

Vehicles benefit from having detection systems which seek information on a wide variety of information about the vehicle surroundings. Detection systems can be used for collision avoidance, self-driving, cruise control, and the like. Detection systems often seek information such as bearing, range, velocity, reflectivity, and image data on objects within the surrounding environment. Different technology, including radar, LiDAR, and cameras, for example, can be employed to help obtain information on the surroundings and provide the information to the driver or to a computer system within the vehicle. However, none of these systems can individually obtain all desired information. Therefore vehicle detections systems often employ multiple systems which leads to increased cost, additional space occupied on the vehicle, and an inability of the multiple detection systems to accurately share information.

SUMMARY OF THE INVENTION

In light of the needs described above, in at least one aspect, there is a need for a compact and cost effective vehicle detection system. Further, there is a need for a single vehicle detection system which can do the job of numerous detection systems, eliminating the need for information sharing between multiple systems coming from multiple locations.

In at least one aspect, the subject technology relates to a detection system for a vehicle in an environment. The detection system includes a lens within an aperture. A line camera is configured to receive light passing through the lens from the environment to generate image data. A LiDAR system is configured to transmit light through the lens to the environment and receive light passing through the lens from the environment to generate range data. The line camera can be a time delay integrating line camera. In some embodiments, the LiDAR system is further configured to transmit light within a set region of the electromagnetic spectrum and the line camera is configured to receive light within the same set region. In some cases, the set region is near-infrared and the line camera is near-infrared sensitive. Additionally, in some embodiments, the detection system includes at least one infrared transmitter to transmit a light beam within the infrared region of the electromagnetic spectrum into the environment. Further, in some embodiments, the set region is infrared and the line camera is infrared sensitive. The line camera can be a red-green-blue (RGB) camera and the image data can include a high resolution color video stream. In some cases the line camera comprises a plurality of both RGB pixels and near infrared pixels.

In some embodiments, the line camera has a plurality of optical receivers arranged in a column extending along a first axis, each optical receiver configured to receive light reflected from an object within the environment, the object having a position corresponding to a position of said optical receiver with respect to the first direction. In some cases, the line camera has an array of optical receivers with a plurality of columns of optical receivers, each column extending along a first axis. Further the detection system can be configured to scan by changing the line of vision of the line camera and LiDAR system along a transverse plane substantially orthogonal to the first axis. Additionally, the line camera can be a time delay integrating camera configured to generate high resolution image data based upon: the light received by the line camera; the position of each optical receiver within the array; and a speed of the scan. In some embodiments, a light source is configured to distribute light within a set region of the electromagnetic spectrum to illuminate the environment and the line camera is configured to receive light within the set region.

In some embodiments, the LiDAR system has a plurality of transmitters arranged in a column extending along a first axis and a plurality of receivers arranged in a column extending along the first axis. Each receiver is configured to receive a reflection of at least one light beam sent by a transmitter from a shared position with respect to the first axis. The line camera can include a plurality of optical receivers arranged in a column extending along a first axis, each optical receiver configured to receive light from a position within the environment corresponding to the position of said optical receiver with respect to the first axis. Further, the LiDAR system can have a plurality of transmitters arranged in a column extending along the first axis and a plurality of receivers arranged in a column along the first axis. Each receiver is configured to receive a reflection of one light beam sent by a transmitter from a shared position with respect to the first axis. In some embodiments, a scanning mirror is positioned to direct light between the outside environment and the lens such that the scanning mirror is rotatable to change a field of view of the line camera and the LiDAR in a transverse direction, the transverse direction substantially orthogonal to the first axis. In some embodiments, a controller is configured to modify data elements of the image data based on data elements of the range data corresponding to a shared time and location within the environment. Further, the controller can be configured to modify data elements of the range data based on data elements of the image data corresponding to a shared time and location within the environment.

In at least one aspect, the subject technology relates to a detection system for a vehicle in an environment including a housing defining an aperture. A lens is included within the aperture. A time delay integrating (TDI) line camera comprising a plurality of optical receivers is configured to receive light within a set region of the electromagnetic spectrum passing through the lens from the environment. The system includes a plurality of LiDAR transmitters, each LiDAR transmitter configured to transmit a light beam through the lens. The system also includes a plurality of LiDAR receivers, each LiDAR receiver configured to receive a reflected light beam of a corresponding LiDAR transmitter, the reflected light beams passing through the lens from the environment after reflecting off an object in the environment.

In some embodiments, the system includes a first support member having a first surface forming a first plane facing the lens, the LiDAR receivers coupled to the first surface of the first support member. Further, a second support member can be positioned between the first support member and the lens, the second support having a first surface facing the lens and a second surface facing the first support member, the second support member defining holes matching the size and position of the LiDAR transmitters and receivers to allow the reflected light beams to pass therethrough for receipt by the LiDAR receivers. In some embodiments, the system includes a third support member having a first surface forming a second plane orthogonal to the first plane, the LiDAR transmitters coupled to the first surface of the third support member to transmit the light beams parallel to a first axis orthogonal to the second plane. Further, a beam splitter can be disposed between the lens and the second support member. The beam splitter can be configured to deflect the transmitted light beams along a second axis orthogonal to the first axis and allow the reflected light beams to pass therethrough. Further, the TDI line camera can be coupled to the first surface of the second support member. In some embodiments, the LiDAR transmitters are coupled to the first surface of the second member.

In some embodiments, the system includes a third support member having a first surface forming a second plane orthogonal to the first plane and a TDI line camera is coupled to the third support member. A first beam splitter can be positioned between the lens and the first surface of the second support member. The first beam splitter can be configured to deflect the transmitted light beams from a first axis orthogonal to the second plane to a second axis orthogonal to the first axis and passing through the lens while allowing the reflected light beams to pass therethrough. A second beam splitter can be positioned between the first beam splitter and the lens. The second beam splitter can be configured to deflect light within the set region of the electromagnetic spectrum from the second axis to a direction parallel to the first axis and into the TDI line camera. Further, the second beam splitter can allow the transmitted light beams to pass therethrough while allowing the reflected light beams to pass therethrough. In some embodiments the detection system is configured such that the transmitted light beams, the reflected light beams, and the light within the set region of the electromagnetic spectrum received by the TDI line camera pass through the lens substantially along the second axis.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1A:
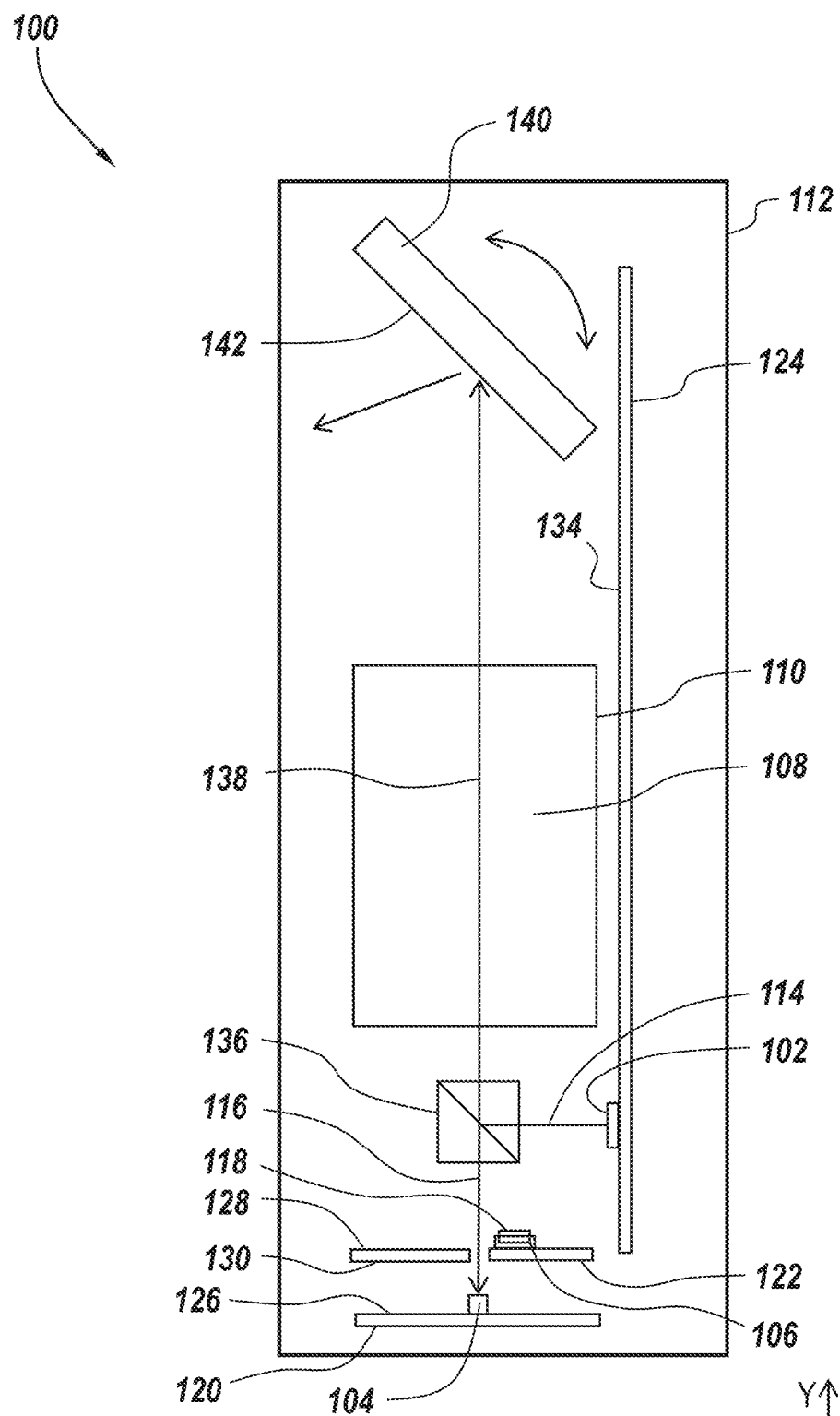
FIG. 1A is an overhead view of a detection system for a vehicle in accordance with the subject technology.

The subject technology overcomes many of the prior art problems associated with vehicle detection systems. In brief summary, the subject technology provides detection system with a combined LiDAR system and line camera. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Further, beam splitters, support members and other features describe herein which are numbered only to facilitate a discussion of those features with respect to one another. The numbers of each component do not refer to any particular order (e.g. where one must be before two) and in various embodiments any component can switch numbers with another numbered component. For example, if a first and second support member are described, the second support member could just as appropriately be deemed the first support member and vice versa.

Figure 1B:
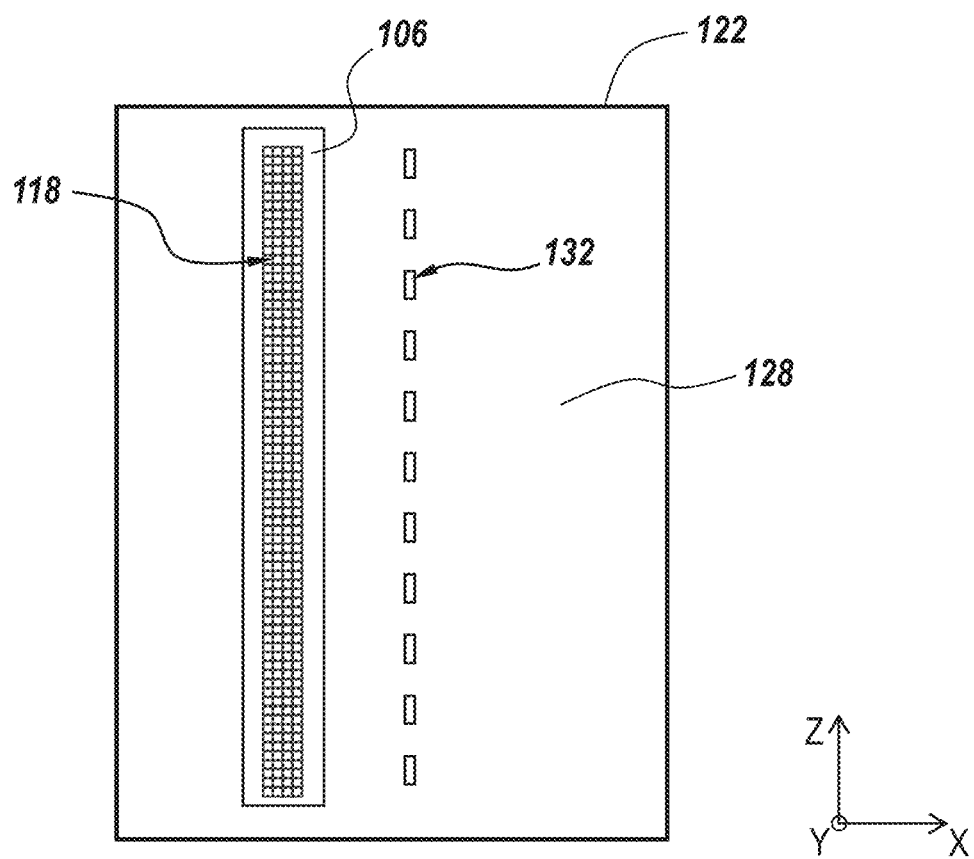
FIG. 1B is a front view of the second support member of the detection system of FIG. 1A.

Referring now to FIGS. 1A, 1B, a detection system for a vehicle in accordance with the subject technology is shown generally at 100. The detection system 100 can be mounted on or within a vehicle (not distinctly shown) and can be used generally to gather information and generate data on the surrounding environment. The detection system 100 includes a LiDAR system (comprised of LiDAR transmitters 102 and LiDAR receivers 104) and a line camera 106 which share a lens 108 within an aperture 110. While all components are shown in a single housing 112 in the embodiment of system 100, separate housings may be employed for one or more of the components. The LiDAR system and line camera 106 can be placed in separate individual housings while still being directed through a shared aperture 110 and shared lens 108. Further, the term "lens" is used throughout and it should be understood that a lens may be comprised of several pieces of glass of differing shapes, thickness, and/or curvature mounted within an aperture 110. The term "lens" is not limited to a single piece of glass. In general, the lens 108 can work to improve signal to noise ratio by optically filtering of the light before receipt by the LiDAR receivers 104 and/or line camera 106. Additionally, while the LiDAR system and line camera 106 are often shown as different components, they may also be combined as a single chip sensor (e.g. the single chip sensor combining LiDAR functionality with the capabilities of the various embodiments of line cameras discussed below).

The LiDAR system includes the necessary components for target detection using LiDAR as are found in typical LiDAR systems known in the art. The LiDAR system includes a plurality of LiDAR transmitters 102 each configured to transmit a light beam 114 through the lens 108. The LiDAR transmitters 102 are emitters of optical radiation such as laser diodes configured to generate pulsed lasers or light beams 114 for reflection off objects within the environment (not distinctly shown, but generally the area outside the housing and/or surrounding the vehicle). The light beams 114 transmitted by the LiDAR transmitters 102 can be one, or a combination of, red/green/blue, infrared, and/or near infrared led, for example. After reflecting off an object within the environment, the laser pulse or light beam 114 is returned through the lens 108 and the reflected beam 116 is received by a LiDAR receivers 104. The LiDAR receivers 104 are optical detection devices configured in a column or array to receive the reflected light beams 116 and convert the reflected light beams 116 into electrical signals. Processing circuitry (not distinctly shown) then processes and stores data related to the objects within the environment based on the electrical signals. In particular, the LiDAR system generates data regarding 3D range data on objects within the environment.

Meanwhile the line 106 camera seeks to generate high resolution image data, particularly in the visible or near infrared region of the electromagnetic spectrum. The line camera 106 can be a time delay integrating (TDI) line camera 106 arranged to scan along a plurality of optical receivers 118 arranged in a column or array. The optical receivers 118 are configured to receive light which is reflected off objects within the environment and passed through the lens 108. As will be discussed in more detail below, the optical receivers 118 can be configured to receive light within a different region of the electromagnetic spectrum as compared to the LiDAR receivers 104. Alternatively, there can be overlap between the chosen regions of the electromagnetic spectrum for the LiDAR receivers 104 and optical receivers 118. The exposure time for each optical receiver 118 within a column is very short which allows for high resolution in the scanning direction of the line camera 106. Processing circuitry (not shown) then applies time delay integration to the data obtained by the optical receivers 118 to generate high resolution image data. Further, when an array of optical receivers 118 is used (e.g. as seen in FIG. 1B), the processing circuitry can match the exposures of the optical receivers 118 based on the scan speed and timing to generate high resolution data with a good signal to noise ratio.

More particularly, using a TDI line camera 106 allows for the capture of images of moving objects at low light levels with improved signal to noise ratio. One image strip or column of a moving scene or object can be captured by the line camera 106, particularly for a scene or object moving at a right angle with respect to the line camera 106. This is done by arranging the optical receivers 118 in several columns and shifting the partial measurements of each optical receiver 118 to adjacent rows synchronously with the motion of the image across the array of optical receivers 118.

One example of a typical TDI line camera 106 that can be used in accordance with the subject technology would be a line camera with 2048 total optical receivers and 128 optical receivers per TDI line (i.e. per column).

Typically, the line camera 106 will be designed to receive light within a set region of the electromagnetic spectrum. For example, the line camera 106 can be a red, green, blue pixelated (RGB) line camera 106 with optical receives 118 calibrated to receive light within the visible light spectrum. The RGB camera 106 can then generate a high resolution color video stream (with the help of the processing circuitry) which can then be provided to a driver via a display within the vehicle or used for automatic image processing for the detection of areas or objects of interest in the surrounding environment. Additionally, or alternatively, some or all of the optical receivers 118 can receive and detect light from/in an infrared or near infrared region of the electromagnetic spectrum, resulting in night vision capabilities for the line camera 106 even when no ambient light is provided. In some cases, one or more separate light sources (or optical transmitters such as the LiDAR transmitters 102) can also transmit light within the same region of the electromagnetic spectrum within which the line camera 106 is configured to receive light such that objects in the environment are illuminated for the line camera 106. For example, if some of the optical receivers 118 of the line camera 106 are configured to receive light in the infrared or near infrared spectrum, LiDAR transmitters 102 can transmit light within the infrared or near infrared spectrum to illuminate objects for the line camera 106. The processing circuitry can then gate the information to improve image quality and gather range information. Alternatively, when the light source is separate from the LiDAR system (e.g. a headlight or floodlight), the light source can transmit light having a wavelength that is in a region of the electromagnetic spectrum outside of the region of the LiDAR transmitters 102 to avoid potential disturbances. For example, if the LiDAR transmitters 102 are designed to transmit between a wavelength of 905 nm and 940 nm, the separate transmitter can transmit at a wavelength of 860 nm. The separation in wavelength of between 45 nm and 80 nm is effective in avoiding interference between the LiDAR system and the line camera 106. In some cases, the line camera 106 can include both RGB pixels and near infrared pixels, allowing the line camera 106 to generate a high quality color video stream when the environment is well lit (e.g. daytime) while still allowing useful data to be gathered by light within the near infrared spectrum in times of low ambient light (e.g. nighttime). The processing circuitry for the LiDAR system and line camera 106 can either be incorporated within the LiDAR system and line camera 106, or can be provided as separate components.

Still referring to FIGS. 1A, 1B, in the embodiment shown three support members 120, 122, 124 are included within the housing 112. The first support member 120 has a first surface 126 forming a first plane facing the lens 108 (i.e. along the x-z axes), the LiDAR receivers 104 are coupled to the first surface 126 of the first support member 120. A second support member 122 is positioned between the first support member 120 and the lens 108. The second support member 122 also forms a plane along the x-z axes. A first surface 128 of the second support member 122 faces the lens 108 while a second surface 130 faces the first support member 120.

The second member 122 defines a plurality of holes 132 which match the size and position of the LiDAR transmitters 102 and receivers 104 to allow the reflected light beams to pass therethrough for receipt by the LiDAR receivers 104. For example, in some cases the LiDAR transmitters 102 and receivers 104 are arranged in columns, each transmitter 102 having a corresponding receiver 104 at a shared elevation or position along the z axis. Similarly a column of holes 132 can be provided, one hole 132 for each corresponding LiDAR transmitter 102/receiver 104 pairing, at a position along the z axis which corresponds to the position of the transmitter 102/receiver 104 and a size which allows the LiDAR light beam to pass therethrough. The holes 132 act to filter unwanted ambient light while still allowing the reflected beam of a corresponding LiDAR transmitter 102 to pass into a corresponding receiver 104. Reducing ambient light provides increased accuracy while allowing for a large detector, such as a silicon photomultiplier (SiPM).

A third support member 124 has a first surface 134 forming a second plane along the y-z axes, the second plane being orthogonal to the plane of the first and second support members 120, 122. The LiDAR transmitters 102 are coupled to the first surface 134 of the third support member 124 to transmit light beams 114 parallel to the x-axis (i.e. orthogonal to the second plane). While the x-axis does not pass through the lens 108, a beam splitter 136 is disposed between the lens 108 and the second support member 122. The beam splitter 136 can be one of the many types of known beam splitters, such as wavelength dependent or polarized. As shown, the beam splitter 136 is configured to redirect some light while allowing other light to pass through. In some embodiments, whether the light is reflected or allowed to pass through the beam splitter 136 can be based on a certain property of the light, such as wavelength. In other cases, the beam splitter 136 can simply reflect a portion of all light that hits it while allowing a portion of the light to pass through. In the particular embodiment shown, the beam splitter 136 deflects at least some of the transmitter light beams 114 which originate from the LiDAR transmitters 102 and redirects the light beams 114 along the y axis (orthogonal to the x-z plane) such that the redirected light beams 138 are directed through the lens 108 and into the environment. When the light beams return through the lens 108 after reflecting off an object within the environment (e.g. along the same path as redirected light beams 138), the beam splitter 136 allows at least some of the reflected light beams 116 to pass therethrough without deflection. As a result, the reflected light beams 116 travel through the beam splitter 136 for receipt by the LiDAR receivers 104, which are positioned behind the beam splitter 136 with respect to the lens 108.

The optical receivers 118 of the line camera 106 are positioned adjacent to the holes 132 through the second support member 122 to share a line of vision through the lens 108 with the LiDAR system. The optical receivers 118 can be positioned wide enough along the second support member 122 such that they have direct line of vision through the lens 108. Therefore the light received by the optical receivers 118 can pass through the lens 108 and into the receivers 118 without ever passing through the beam splitter 136. Alternatively, the receivers 118 can be positioned closer to the holes 132 and the beam splitter 136 can be configured to allow at least some light to pass therethrough. In the case where the optical receivers 118 are configured to receive light in a set region of the electromagnetic spectrum that is different from that of the LiDAR system, the beam splitter 136 can be configured to a allow all (or a majority of) light with a wavelength within the set region to pass therethrough.

The detection system 100 also includes a scanning mirror 140 formed from reflective metal or other reflective material (e.g. thin film coatings) to redirect light between the environment and the LiDAR system and line camera 106. While the exemplary scanning mirror 140 has a single flat reflective surface 142 (the surface 142 which extends along the z axis), the scanning mirror 140 may be any type of reflective means which can be manipulated to change the field of view of the LiDAR system and line camera 106 (e.g. a rotating prism or oscillating mirror). The scanning mirror 140 can be mounted within a shared housing 112, or can be mounted separately onto the vehicle while still being visible to the LiDAR system and line camera 106 through the lens 108. The scanning mirror 140 rotates about the z-axis, changing the field of view of the detection system 100 along the x-y plane without requiring movement of the other parts. While the scanning mirror 140 enlarges field of view by scanning the x-y plane, LiDAR system and line camera 106 can have receivers 104, 118 (and transmitters 102 of the LiDAR system) arranged in a column extending along the z axis. In this way, the numerous transmitters 102 and receivers 104, 118 allow the LiDAR system and line camera 106 to gain a large field of view along the z axis while the scanning mirror 140 allows increased field of view across the x-y axes. Therefore the column arrangement of the transmitters 102 and receivers 104, 118 combined with the scanning mirror 140 effectively provides vision across all three axes x, y, z.

To that end, the line camera 106 is shown with an array of optical receivers 118 formed from four adjacent columns of optical receivers 118, each column extending along (i.e. parallel to) the z-axis. With many optical receivers 118 located at different positions along the z-axis, the line camera 106 is able to receive light deflected off an object at different points along the z-axis. This both expands the range of vision of the line camera 106 along the z-axis and allows for time delay integration (TDI) when the object is moving. While in some embodiments, only a single column of optical receivers 118 is used, providing multiple columns of optical receivers in an array of optical receivers 118 provides additional benefits, such as expanded field of view and improved ability to identify and account for object movement. When an array of optical receivers 118 is used and the line camera 106 is a TDI line camera 106, the corresponding processing circuitry can be configured to adjust the high resolution image data generated based upon further upon the position of each optical receiver 118 and the speed of the scan across the array of receivers 118. For example, adjacent rows within the array can shift partial measurements to account for scan speed and object movement speed.

Similarly to the optical receivers 118 of the line camera 106 (while not distinctly shown in FIGS. 1A, 1B) the LiDAR transmitters 102 and receivers 104 can be arranged in a single column extending along the z-axis or in an array extending along the z-axis (e.g. adjacent columns of transmitters 102 and/or receivers 104 parallel to the z-axis). For example, a column of LiDAR receivers 104 can be provided to correspond to the holes 132 within the second support member 122, the holes 132 allowing reflected transmitted light beams 116 to pass through the second support member 122 for receipt by the LiDAR receivers 104. In most cases each LiDAR receiver 104 will be positioned at a shared location on the z-axis as one of the LiDAR transmitters 102 to receive the reflected light beam 116 originally generated by that LiDAR transmitter 102. Since the LiDAR transmitters 102 and receivers 104, like the line camera 106, are generally positioned in columns along the z-axis, scanning in the x-y direction by the scanning mirror 140 results in broad vision along the x, y, and z axes.

Since the LiDAR system and line camera 106 are in very close proximity and utilize a shared lens 108, the LiDAR system can modify the data it obtains based on data obtained by the line camera 106 and vice versa. In some cases, as will be discussed more below, the LiDAR system and line camera 106 can even share the same optical axis. Range data obtained through the LiDAR system and image data obtained through the line camera 106 can be merged for simultaneous signal processing. Additionally, in some cases the LiDAR system and line camera 106 can be set to receive light within different regions of the electromagnetic spectrum. As such, objects illuminated to one system (LiDAR system or line camera 106) will not necessarily be completely illuminated by the other system. To that end, small gaps in data elements representing a certain time and location within the environment for one system (LiDAR system or line camera 106) can be filled in based on the data generated by the other. Further, using information from high resolution RGB or near infrared images can be used to interpolate 3D range data, for example, improving edge detection in low resolution 3D imaging.

Figure 2A:
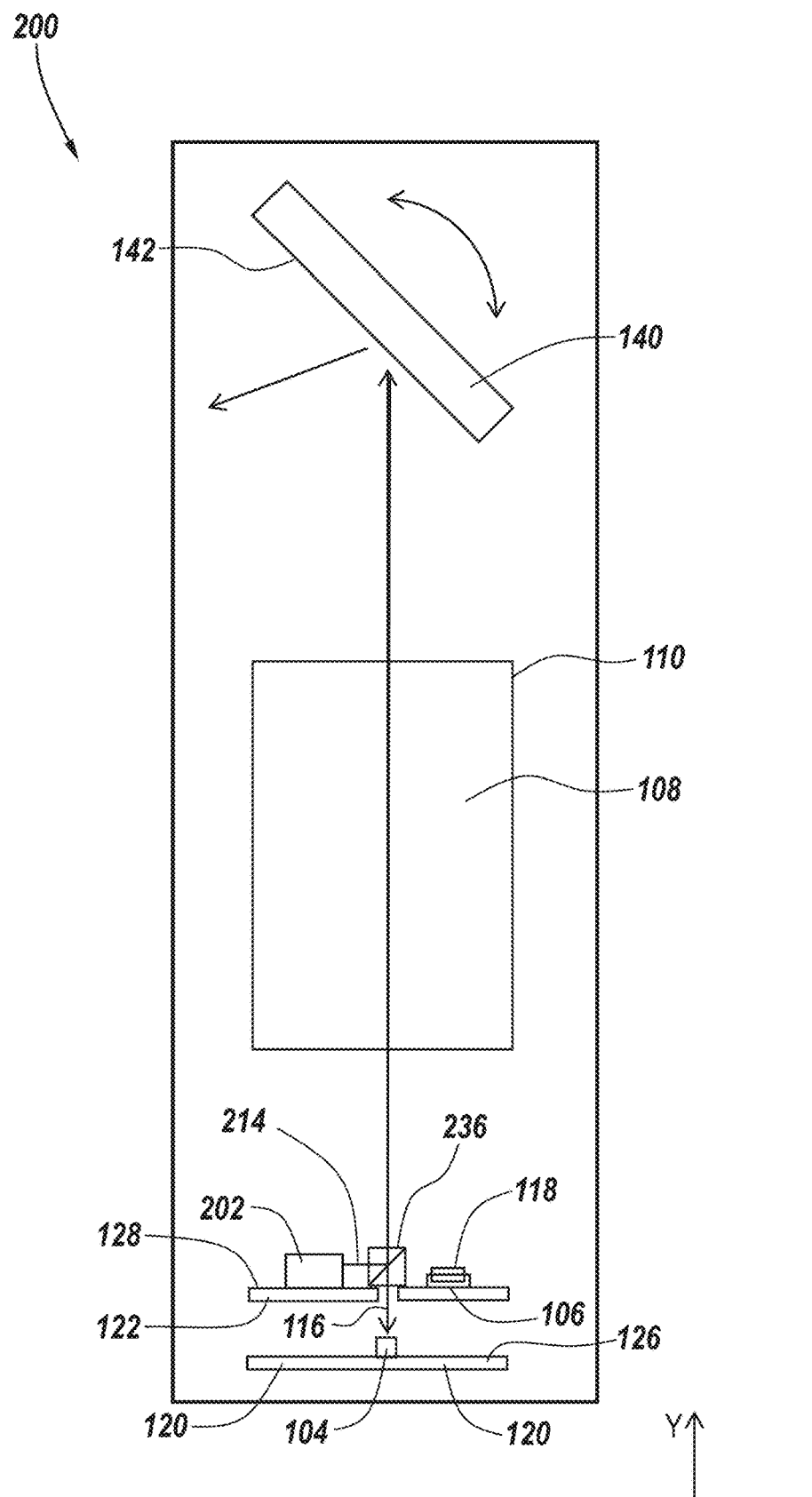
FIG. 2A is an overhead view of a detection system for a vehicle in accordance with the subject technology.
Figure 2B:
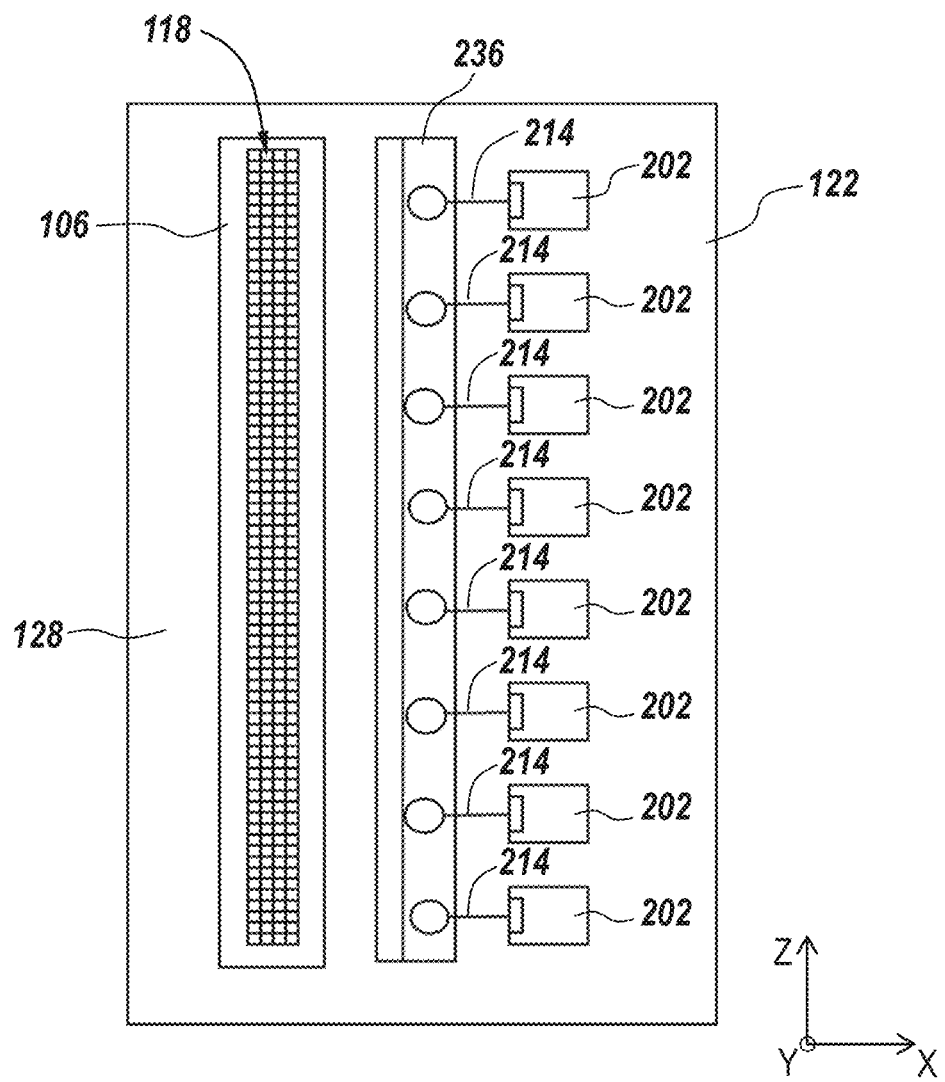
FIG. 2B is a front view of the second support member of the detection system of FIG. 2A.

Referring now to FIGS. 2A, 2B, another embodiment of a detection system in accordance with the subject technology is shown generally at 200. The system 200 is generally similar to the system 100 as described above, the major differences being shown and described herein. In particular, the system 200 has no third member 124, has a different arrangement of LiDAR transmitters 202, and uses a different beam splitter 236.

In the system 200, the LiDAR transmitters 202 are positioned along the first surface 128 of the second support member 122. The LiDAR transmitters 202 are transmitter to transmit a light beam 214 parallel to the first surface 128 of the second support member 122 (i.e. along the x-y plane). The LiDAR transmitters 202 are arranged in a column along the z-axis and corresponding LiDAR receivers 104 are arranged to receive reflected light beams 116 that have passed through the beam splitter 236. While the location of the beam splitter 236 is different in system 200 as compared to the beam splitter 136 of system 100, the beam splitter 236 is configured to act similarly to the beam splitter 136. That is, the beam splitter 236 is configured to deflect transmitted light beams 214 from the x-axis to the y-axis and through the lens 108. The beam splitter 236 then allows the reflected light beams 116, which have returned after reflecting off an object within the environment, to pass therethrough for receipt by the LiDAR receivers 104. Notably, the beam splitter 236 is positioned close to, or even attached to, the first surface 128 of the second support member 122. This allows the optical receivers 118 of the line camera 106 to directly receive light passing through the lens 108 from the environment without requiring the light to pass through the beam splitter 236.

Figure 3A:
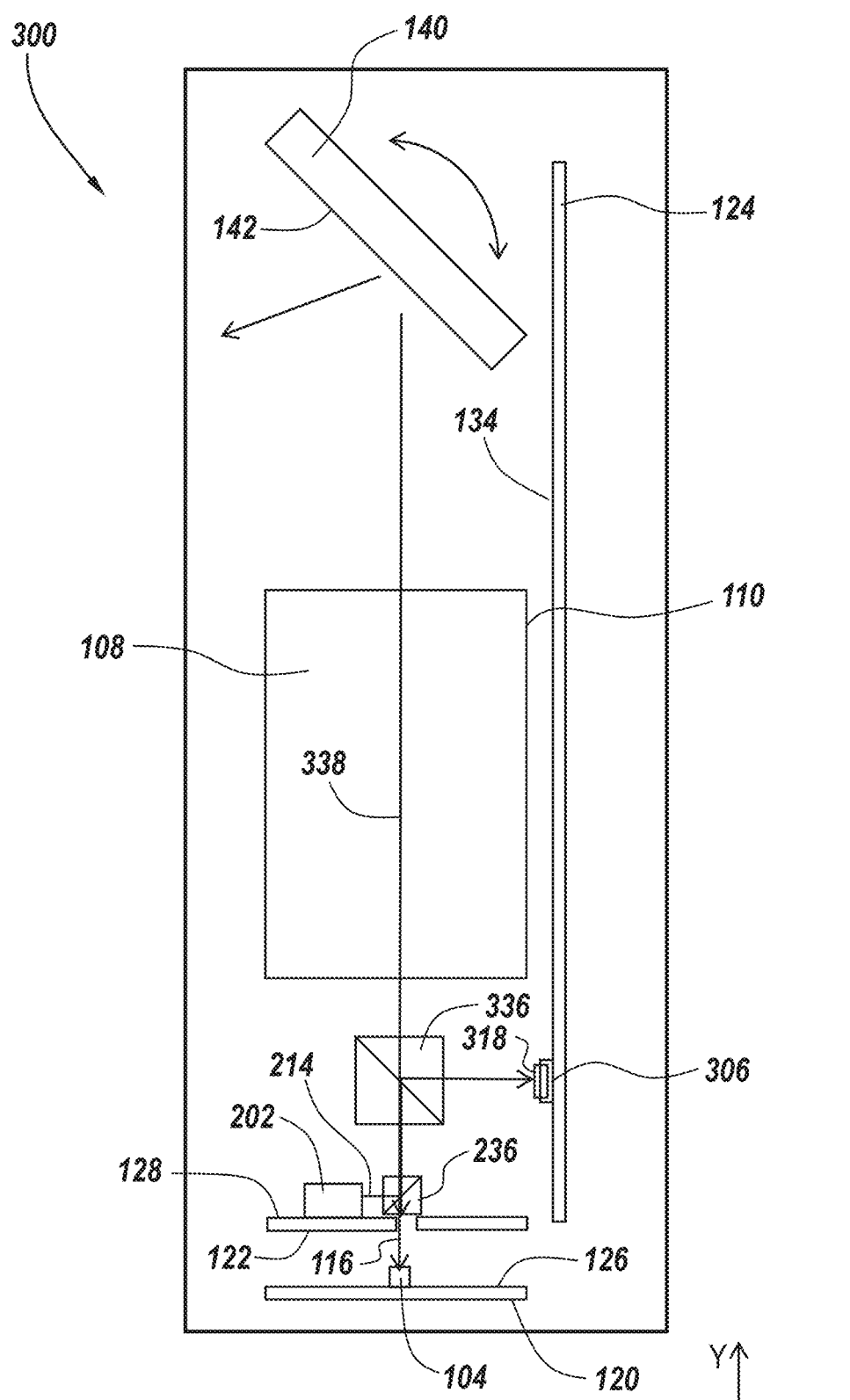
FIG. 3A is an overhead view of a detection system for a vehicle in accordance with the subject technology.
Figure 3B:
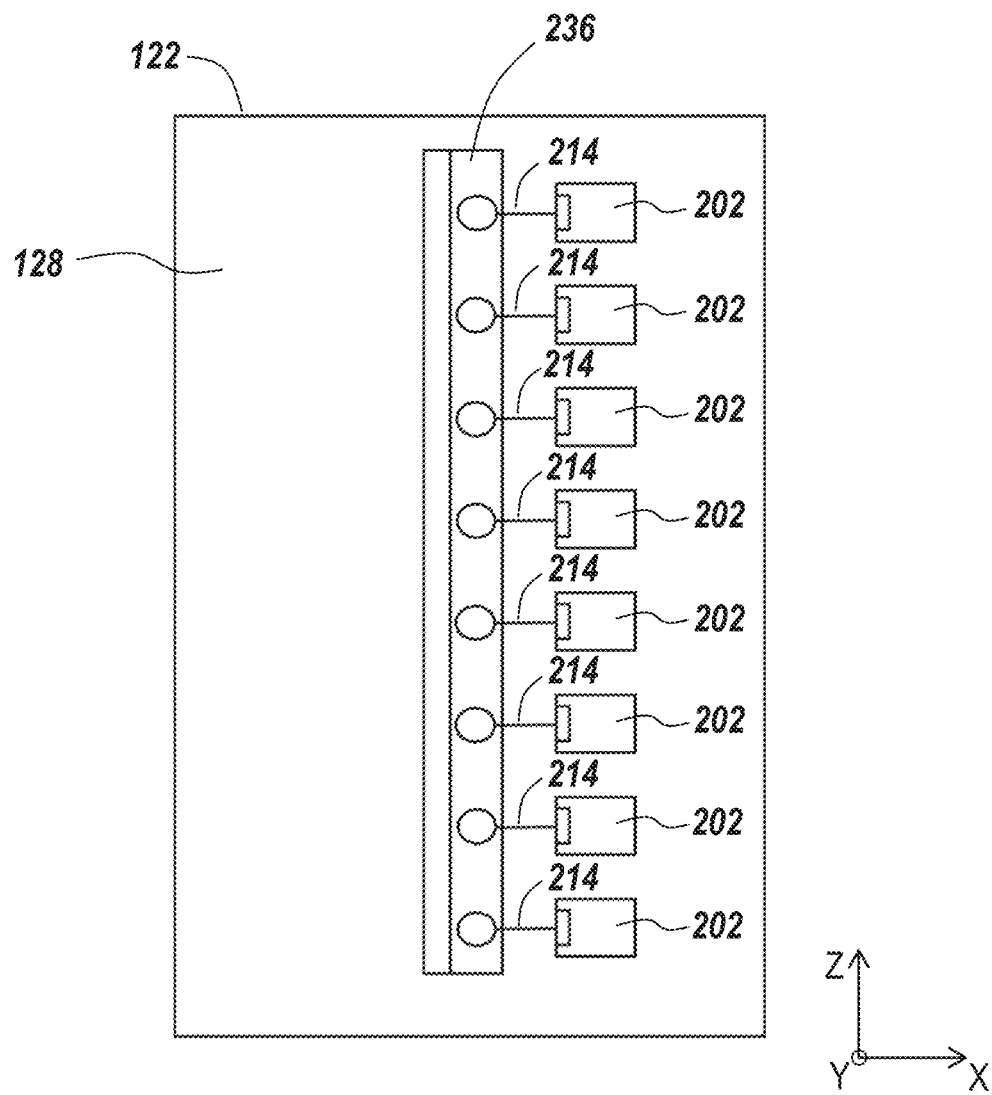
FIG. 3B is a front view of the second support member of the detection system of FIG. 3A.

Referring now to FIGS. 3A-3B another embodiment of a detection system in accordance with the subject technology is shown generally at 300. The system 300 is generally similar to the system 100 as described above, the major differences being shown and discussed herein. The system 300 includes LiDAR transmitters 202 and a beam splitter 236 configured similarly to those seen the system 200. The system 300 has a line camera 306 which is positioned differently than the line camera 106 and includes a second beam splitter 336, as will be discussed in more detail herein.

The system 300 includes the third support member 124 as seen in system 100 which forms a plane along the y-z axes. However, instead of LiDAR transmitters 102, a line camera 306 is coupled to the first surface 134 of the third support member 124. The line camera 306 can be configured to function in accordance with any of the line cameras described herein. As with system 200, a beam splitter 236 is positioned between the lens 108 and the first surface 128 of the second support member 122. Likewise, the LiDAR transmitters 202 are coupled to the first surface 128 of the second support member 122, each LiDAR transmitter 202 configured to transmit a light beam 214 along the x-axis. The beam splitter 236 deflects the transmitted light beams 214 to the y-axis, the deflected light beams passing through the lens 108 along line 338. Further, when the reflected light beams 116 return, they pass through the beam splitter 236 (and optionally through holes 132 as seen in FIG. 1A) for receipt by the LiDAR receivers 104.

In the system 300, a second beam splitter 336 is positioned between the first beam splitter 236 and the lens 108. The second beam splitter 336 deflects light traveling through the lens along the y axis (e.g. down line 338) towards the line camera 306 (e.g. along the x-axis). In particular, if the line camera 306 is configured to receive light within a set region of the electromagnetic spectrum, the beam splitter 336 can be configured to deflect light within that same region along the x-axis and towards the line camera 306, allowing light outside of that region to pass through. Alternatively, the beam splitter 336 can be further configured to ensure that light beams pass through when the light beams are within a region of the electromagnetic spectrum within which the LiDAR system operates. In any case, the second beam splitter 336 should allow the transmitted light beams and reflected light beams to pass therethrough while deflecting some or all of the light incoming from the environment to the line camera 306. The types of beam splitters 236, 336 used can be in accordance with any of the types discussed above or known in the art. The configuration of system 300 results in the transmitted light beams 214, the reflected light beams 116, and the light received by the line camera passing along a shared optical axis (i.e. along line 338) through the lens 108. This primarily coaxial arrangement allows for smaller components (e.g. a small shared lens 108) and easy information sharing between the LiDAR system and line camera 306 since the LiDAR receivers 104 receive reflected light from the same area of the environment as the optical receivers of the line camera 306.

Referring now to FIGS. 4A-4D overhead views of additional orientations of components for detection systems 400a, 400b, 400c, 400d (generally 400) are shown. The systems 400 contain all of the other necessary components for a detection system as described herein and known in the art, such as the systems 100, 200, 300. However, limited components are shown for the systems 400 for brevity, it being understood that the components shown in the systems 400 will be used in conjunction with the other necessary components of detections systems as described herein. The components shown in the systems 400 are generally limited to some combination of LiDAR transmitters 402 and receivers 404, a line camera 406, beam splitters 436, support members 422, and select light beams 418. It should be understood that all components shown within the systems 400 can be configured like, or function similar to, like components found within the other systems 100.

All of the systems 400 have differences in the arrangement of the components. The system 400a in FIG. 4A includes two columns or arrays of LiDAR transmitters 402 which transmit light beams 418 for deflection off beam splitters 436a, 436b. The light beams 418 reflect off objects within the surrounding environment and can return through holes 432 in a support member 422 for receipt by the LiDAR receivers. A line camera 406 is positioned to receive light from the environment passing through one of the beam splitters 436b.

Figure 4A:
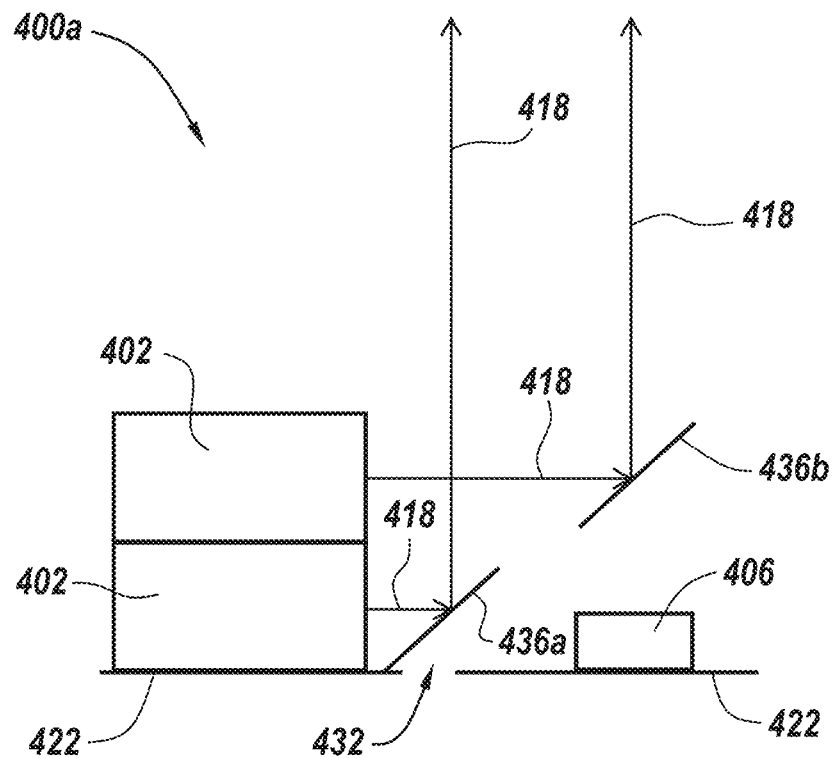
FIGS. 4A-4D are overhead views showing various orientations of components of detection systems which can be applied in accordance with the detection systems shown in FIGS. 1A-3B.
Figure 4B:
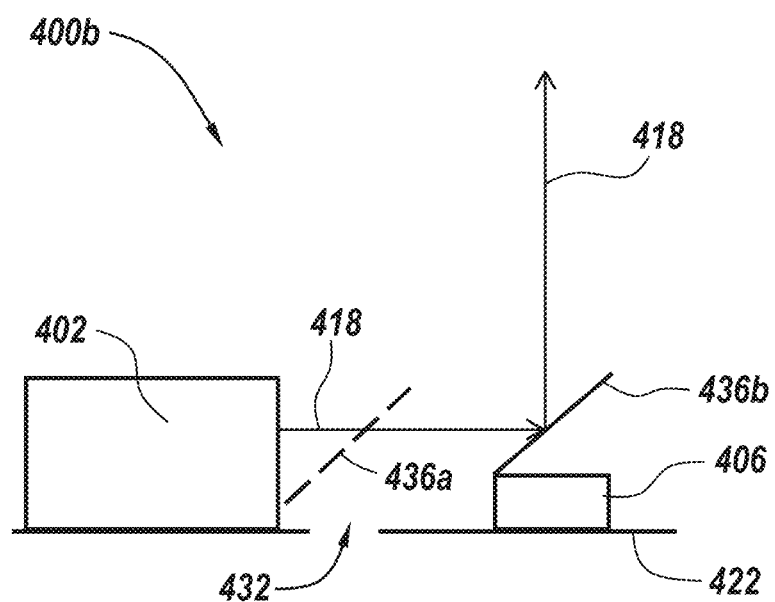

The system 400b in FIG. 4B has a single column or array of LiDAR transmitters 402 transmitting light beams 418. The light beams passing through a first beam splitter 436a and are deflected by a second beam splitter 436b. The first beam splitter 436a allows reflected light beams to pass therethrough such that the reflected light beams can pass through the holes 432 in the support member 422 for receipt by the LiDAR receivers. The second beam splitter 436b allows light from the environment to pass therethrough for receipt by the line camera 406.

Figure 4C:
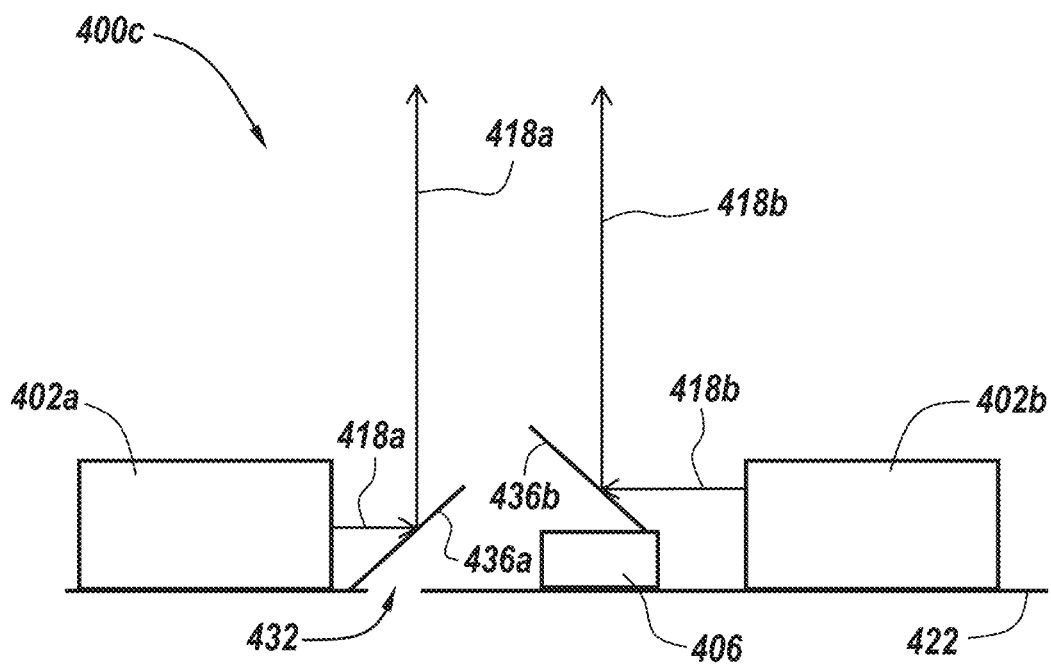

The system 400c in FIG. 4C has two columns or arrays of LiDAR transmitters 402a, 402b transmitting light beams. A first beam splitter 436a reflects light beams 418a from the first transmitter 402a into the environment where the light beams 418 reflect off objects. Reflected light beams can then return to pass through the first beam splitter 436a and through holes 432 for receipt by LiDAR receivers. Meanwhile the second beam splitter 436b reflects light beams 418b from the second column or array of LiDAR transmitters 402b. In some cases, the second column or array of LiDAR transmitters 402b can transmit light in a region of the electromagnetic spectrum that overlaps with, or is the same as, a region within which the line camera 406 will receive light. At least some of the returning light within the region of the electromagnetic spectrum of the line camera 406 will then pass through the second beam splitter 436b for receipt by the line camera 406.

Figure 4D:
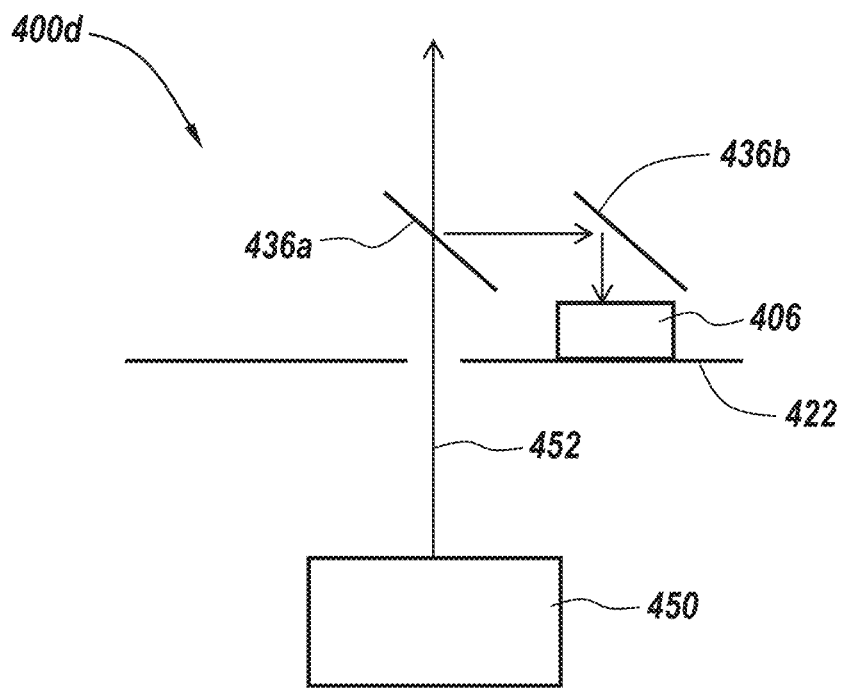

The system 400d in FIG. 4D includes an ambient or visible light source 450 specifically to illuminate objects for the line camera 406. The light source sends light 452 through the support member 422, through the beam splitter 436a, and into the environment. The light 452 then reflects off objects within the environment. The beam splitter 436a deflects the returning light towards a second beam splitter 436b (or reflective mirror) which directs the returning light into the line camera 406.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. processors, circuits, detectors, transmitters, receivers, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A detection system for a vehicle in an environment, comprising:
    a lens within an aperture;
    a line camera configured to receive light passing through the lens from the environment to generate image data, wherein the line camera is a time delay integrating line camera; and
    a LiDAR system configured to transmit light through the lens to the environment and receive light passing through the lens from the environment to generate range data.

2. The detection system of claim 1 wherein the LiDAR system is further configured to transmit light within a set region of the electromagnetic spectrum; and the line camera is configured to receive light within the set region.

3. The detection system of claim 2 wherein the set region is near-infrared and the line camera is near-infrared sensitive.

4. The detection system of claim 3 further comprising at least one infrared transmitter configured to transmit a light beam within the infrared region of the electromagnetic spectrum into the environment.

5. The detection system of claim 2 wherein the set region is infrared and the line camera is infrared sensitive.

6. The detection system of claim 1 wherein:
    the line camera is an RGB camera; and
    the image data comprises a high resolution color video stream.

7. The detection system of claim 1 wherein the line camera comprises a plurality of RGB pixels and near infrared pixels.

8. The detection system of claim 1 wherein the line camera comprises a plurality of optical receivers arranged in a column extending along a first axis, each optical receiver configured to receive light reflected from an object within the environment, the object having a position corresponding to a position of said optical receiver with respect to the first direction.

9. The detection system of claim 1 wherein:
    the detection system is configured to scan by changing the line of vision of the line camera and LiDAR system along a transverse plane substantially orthogonal to the first axis; and
    the line camera is a time delay integrating camera configured to generate high resolution image data based upon: the light received by the line camera; the position of each optical receiver within the array; and a speed of the scan.

10. The detection system of claim 1 further comprising:
    a light source configured to distribute light within a set region of the electromagnetic spectrum to illuminate the environment,
    wherein the line camera is configured to receive light within the set region.

11. The detection system of claim 1 wherein:
    the LiDAR system comprises: a plurality of transmitters arranged in a column extending along a first axis; and a plurality of receivers arranged in a column extending along the first axis, each receiver configured to receive a reflection of at least one light beam sent by a transmitter from a shared position with respect to the first axis.

12. The detection system of claim 1 wherein:
    each optical receiver of the array of optical receivers is configured to receive light from a position within the environment corresponding to the position of said optical receiver with respect to the first axis; and
    the LiDAR system comprises: a plurality of transmitters arranged in a column extending along the first axis; and a plurality of receivers arranged in a column along the first axis, each receiver configured to receive a reflection of one light beam sent by a transmitter from a shared position with respect to the first axis.

13. The detection system of claim 1 further comprising a scanning mirror positioned to direct light between the outside environment and the lens such that the scanning mirror is rotatable to change a field of view of the line camera and the LiDAR system in a transverse direction, the transverse direction substantially orthogonal to the first axis.

14. The detection system of claim 1 further comprising a controller configured to:
modify data elements of the image data based on data elements of the range data corresponding to a shared time and location within the environment; and
modify data elements of the range data based on data elements of the image data corresponding to a shared time and location within the environment.

15. A detection system for a vehicle in an environment, comprising:
a housing defining an aperture;
a lens within the aperture;
a time delay integrating (TDI) line camera comprising a plurality of optical receivers configured to receive light within a set region of the electromagnetic spectrum passing through the lens from the environment;
a plurality of LiDAR transmitters, each LiDAR transmitter configured to transmit a light beam through the lens; and
a plurality of LiDAR receivers, each LiDAR receiver configured to receive a reflected light beam of a corresponding LiDAR transmitter, the reflected light beams passing through the lens from the environment after reflecting off an object in the environment.

16. The detection system of claim 15 further comprising:
a first support member having a first surface forming a first plane facing the lens, the LiDAR receivers coupled to the first surface of the first support member; and
a second support member positioned between the first support member and the lens and having a first surface facing the lens and a second surface facing the first support member, the second support member defining holes matching the size and position of the LiDAR transmitters and receivers to allow the reflected light beams to pass therethrough for receipt by the LiDAR receivers.

17. The detection system of claim 16 further comprising:
a third support member having a first surface forming a second plane orthogonal to the first plane, the LiDAR transmitters coupled to the first surface of the third support member to transmit the light beams parallel to a first axis orthogonal to the second plane; and
a beam splitter disposed between the lens and the second support member, the beam splitter configured to: deflect the transmitted light beams along a second axis orthogonal to the first axis; and allow the reflected light beams to pass therethrough,
wherein the TDI line camera is coupled to the first surface of the second support member.

18. The detection system of claim 16 wherein the LiDAR transmitters are coupled to the first surface of the second member.

19. The detection system of claim 18 further comprising:
a third support member having a first surface forming a second plane orthogonal to the first plane, the TDI line camera coupled to the third support member;
a first beam splitter positioned between the lens and the first surface of the second support member, the first beam splitter configured to: deflect the transmitted light beams from a first axis orthogonal to the second plane to a second axis orthogonal to the first axis and passing through the lens; allow the reflected light beams to pass therethrough; and
a second beam splitter positioned between the first beam splitter and the lens, the second beam splitter configured to: deflect light within the set region of the electromagnetic spectrum from the second axis to a direction parallel to the first axis and into the TDI line camera; allow the transmitted light beams to pass therethrough; and allow the reflected light beams to pass therethrough.

20. The detection system of claim 19 wherein the detection system is configured such that the transmitted light beams, the reflected light beams, and the light within the set region of the electromagnetic spectrum received by the TDI line camera pass through the lens substantially along the second axis.

21. The detection system of claim 1 wherein the line camera comprises an array of optical receivers comprising a plurality of columns of optical receivers, each column extending along a first axis.

* * * * *

UNITED STATES PATENT AND TRADEMARK OFFICE
CERTIFICATE OF CORRECTION

PATENT NO. : 10,684,370 B2
APPLICATION NO. : 15/898392
DATED : June 16, 2020
INVENTOR(S) : Bernard DeMersseman et al.

Page 1 of 1

It is certified that error appears in the above-identified patent and that said Letters Patent is hereby corrected as shown below:

On the Title Page

Under Assignee, "Veoneer US, Inc., Southfield, MA (US)" should read --Veoneer US, Inc., Southfield, MI (US)--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*